US008575557B2

United States Patent
Okada

(10) Patent No.: US 8,575,557 B2
(45) Date of Patent: Nov. 5, 2013

(54) RADIATION DETECTION ELEMENT AND RADIOGRAPHIC IMAGING DEVICE

(75) Inventor: Yoshihiro Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 153 days.

(21) Appl. No.: 13/306,990

(22) Filed: Nov. 30, 2011

(65) Prior Publication Data

US 2012/0132822 A1    May 31, 2012

(30) Foreign Application Priority Data

Nov. 30, 2010  (JP) ................................ 2010-267592
Aug. 23, 2011  (JP) ................................ 2011-181699

(51) Int. Cl.
*G01T 1/24*    (2006.01)

(52) U.S. Cl.
USPC ............ 250/370.08; 250/370.09; 250/370.11; 250/370.14

(58) Field of Classification Search
USPC .................................................. 250/370.08
See application file for complete search history.

(56) References Cited

U.S. PATENT DOCUMENTS

| 5,721,422 A * | 2/1998 | Bird .......................... 250/208.1 |
| 7,462,834 B2 * | 12/2008 | Masazumi ............... 250/370.09 |
| 2010/0294942 A1 * | 11/2010 | Mochizuki et al. ........... 250/366 |

FOREIGN PATENT DOCUMENTS

JP    2004-46143 A    2/2004

* cited by examiner

*Primary Examiner* — Marcus Taningco
(74) *Attorney, Agent, or Firm* — SOLARIS Intellectual Property Group, PLLC

(57) ABSTRACT

The present invention provides a radiation detection element and a radiographic imaging device that may provide optimal resolution that corresponds to the purpose of imaging and to imaging speed, and that may suppress increase in device size. Namely, TFTs of plural pixels in a column direction are connected to the same signal lines. When a moving image is imaged, a control signal is output via a control line, the TFTs of the pixels are turned on, and the charges are read-out from sensor sections. Since the two pixels×two pixels are operated as one pixel and the charges are extracted, resolution may be lowered when compared with a still image and a frame rate may be improved.

16 Claims, 9 Drawing Sheets

RADIATION DETECTION ELEMENT AND RADIOGRAPHIC IMAGING DEVICE

CROSS-REFERENCE TO RELATED APPLICATION

This application claims priority under 35 USC 119 from Japanese Patent Application No. 2010-267592, filed on Nov. 30, 2010, and No. 2010-181699, filed on Aug. 23, 2011, the disclosures of which are incorporated by reference herein.

BACKGROUND OF THE INVENTION

1. Field of the Invention

The present invention relates to a radiation detection element and a radiographic imaging device. Specifically, the present invention relates to a radiation detection element and a radiographic imaging device for imaging a medical radiation image.

2. Description of the Related Art

In recent years, a radiographic imaging device that images a radiation image for medical diagnoses, has been known. The radiographic imaging device detects radiation that is irradiated from a radiation irradiation device, and is passed through a subject of photographing and images a radiation image. The radiographic imaging device collects charges generated according to the irradiated radiation, and reads the charges to image a radiation image. As the radiographic imaging device, a flat panel detector (FPD) panel, such as a cassette, is used.

When imaging a radiation image, it is preferable to image a still image and a moving image (perspective image) by using the same radiographic imaging device (panel). In general, since the still image is used for diagnoses, the still image is required to be imaged with a high resolution (high-resolution pixels). Namely, as for the still image, the high resolution is required and a frame rate (imaging speed) may be low.

Meanwhile, the moving image is mainly used for alignment performed to image the still image, such as positioning the subject of photographing. Therefore, in the case of the moving image, a (grainy) resolution may be low but a high frame rate is required.

Japanese Patent Application Laid-Open (JP-A) No. 2004-46143 discloses a technology for enabling both of the high-speed imaging and a high-resolution imaging. According to this technology, gate lines for connecting a gate driving circuit to each pixel, a gate line of a system A that is connected to pixels of each row or each column, a gate line of a system B that is connected to pixels of plural rows or plural columns, a data line of the system A, and a data line of the system B are provided. In this technology, the high-speed imaging or the high-resolution imaging may be achieved.

However, in the technology described in JP-A No. 2004-46143, different data lines are selected according to a purpose of imaging. Accordingly, this technology increases the number of lines and the number of signal detection circuits that process data output from the data lines, and may raise a device size.

SUMMARY OF THE INVENTION

The present invention provides a radiation detection element and a radiographic imaging device, that may provide optimal resolution according to the purpose of use and an imaging speed, and that may suppress the increase in the device size.

A first aspect of the present invention is a radiation detection element, including: a plurality of pixels that are arrayed in a grid, each pixel including, a sensor section that generates charges according to irradiated radiation, a first switching element that read-out the charges from the sensor section and outputs the charges, and a second switching element that read-out the charges from the sensor section and outputs the charges; a plurality of first control lines connected to control terminals of the first switching elements of the pixels that are adjacent in a row direction; a plurality of second control lines connected to control terminals of the second switching elements of the pixels that are adjacent in the row direction; and a plurality of signal lines each provided for each column of the pixels, and each connected to output terminals of the first switching elements that are adjacent in the column direction, wherein the plurality of signal lines include signal line groups in which some of the signal lines are connected to output terminals of the second switching elements of the pixels that are adjacent in the column direction and that are adjacent in the row direction.

In the first aspect of the present invention, the second switching elements of the plural pixels in the column direction are connected to the signal line group. Therefore, when the charges are read by the second switching element, the charges simultaneously flow out from the plural pixels to one signal line. In the first aspect of the present invention, compared with a case in which the charges are read by the first switching elements, the resolution is low but the frame rate may be improved.

In the first aspect of the present invention, even when the charges are read from the second switching elements, the signal lines, through which the charges flow by the first switching elements, are used. Accordingly, in the first aspect of the present invention, the signal lines need not be separately provided for the second switching elements and thus the increase in size of the radiation detection element may be suppressed.

In a second aspect of the present invention, in the first aspect, the second control lines may be connected to the control terminals of the second switching elements of the pixels that are adjacent in the column direction.

In the second aspect of the present invention, since the number of second switching elements that are simultaneously driven increases, and therefore the frame rate may be improved.

In a third aspect of the present invention, in the above aspects, the second control lines may be arranged between the first control lines of even number rows and the first control lines of odd number rows.

In the third aspect of the present invention, the second switching element may also be used as the second control lines. Accordingly, in the third aspect of the present invention, the increase in the total number of the first control lines and the second control lines may be suppressed.

In a forth aspect of the present invention, in the above aspects, may further include: pixel groups, each including the plurality of pixels in which the output terminals of the second switching elements are connected to signal line group, and the control terminals of the second switching elements are connected to the same second control line, wherein the output terminals of the second switching elements of plural pixels, that are adjacent in the column direction and form the pixel groups, are connected to different signal line groups for each of the pixel groups.

In a fifth aspect of the present invention, in the fourth aspect, the second control lines in which the control terminals of the second switching elements of the plurality of the pixels forming the pixel group and that are adjacent in the column direction, are connected, may be connected to the same external terminal.

In a sixth aspect of the present invention, in the first to fourth aspects, each of the second control lines may be connected to different external terminals.

In a seventh aspect of the present invention, in the above aspects, the first switching elements may be used for acquiring image information from each of the pixel per unit, and the second switching elements may be used for acquiring image information from plural pixels per unit.

An eighth aspect of the present invention is a radiographic imaging device, including: the radiation detection element according to the seventh aspect; and a control section that instructs to image a radiation image and acquires the radiation image from the radiographic imaging device, wherein the control section includes a switching section that switches a first image acquisition method that acquires pixel information from each of the pixel per unit, and a second image acquisition method that acquires pixel information from plural pixels per unit, based on an instruction from the outside.

In a ninth aspect of the present invention, in the eighth aspect, may further include: a radiation irradiation section, wherein the switching section may switch the first image acquisition method and the second image acquisition method, based on control from the radiation irradiation section.

A tenth aspect of the present invention is a radiation detection element including: a first pixel that includes a first sensor section, a first switching element having an input terminal connected to the first sensor section, and a second switching element having an input terminal connected to the first sensor section; a second pixel that includes a second sensor section, a third switching element having an input terminal connected to the second sensor section, and a fourth switching element having an input terminal connected to the second sensor section; a first control line connected to a control terminal of the first switching element and to a control terminal of the third switching element; a second control line connected to a control terminal of the second switching element and to a control terminal of the fourth switching element; a first signal line connected to output terminals of the first switching element, the second switching element, and the fourth switching element; and a second signal line connected to an output terminal of the third switching element.

An eleventh aspect of the present invention is a radiation detection element including: a first pixel that includes a first sensor section, a first switching element having an input terminal connected to the first sensor section, and a second switching element having an input terminal connected to the first sensor section; a second pixel that includes a second sensor section, a third switching element having an input terminal connected to the second sensor section, and a fourth switching element having an input terminal connected to the second sensor section; a third pixel that includes a third sensor section, a fifth switching element having an input terminal connected to the third sensor section, and a sixth switching element having an input terminal connected to the third sensor section; a fourth pixel that includes a fourth sensor section, a seventh switching element having an input terminal connected to the fourth sensor section, and an eighth switching element having an input terminal connected to the fourth sensor section; a first control line that includes a control line connected to a control terminal of the first switching element and a control terminal of the third switching element, and a control line connected to a control terminal of the fifth switching element and a control terminal of the seventh switching element; a second control line that includes a control line connected to a control terminal of the second switching element and a control terminal of the fourth switching element, and a control line connected to a control terminal of the sixth switching element and a control terminal of the eighth switching element; a first signal line connected to output terminals of the first switching element, the second switching element, the fourth switching element, the fifth switching element, the sixth switching element, and the eighth switching element; and a second signal line connected to output terminals of the third switching element and the seventh switching element.

A twelfth aspect of the present invention is a radiation detection element including: a first pixel that includes a first sensor section, a first switching element having an input terminal connected to the first sensor section, and a second switching element having an input terminal connected to the first sensor section; a second pixel that includes a second sensor section, a third switching element having an input terminal connected to the second sensor section, and a fourth switching element having an input terminal connected to the second sensor section; a third pixel that includes a third sensor section, a fifth switching element having an input terminal connected to the third sensor section, and a sixth switching element having an input terminal connected to the third sensor section; a fourth pixel that includes a fourth sensor section, a seventh switching element having an input terminal connected to the fourth sensor section, and an eighth switching element having an input terminal connected to the fourth sensor section; a first control line that includes a control line connected to a control terminal of the first switching element and a control terminal of the third switching element, and a control line connected to a control terminal of the fifth switching element and a control terminal of the seventh switching element; a second control line that includes a control line connected to a control terminal of the second switching element, a control terminal of the fourth switching element, a control terminal of the sixth switching element, and a control terminal of the eighth switching element; a first signal line connected to output terminals of the first switching element, the second switching element, the fourth switching element, the fifth switching element, the sixth switching element, and the eighth switching element; and a second signal line connected to output terminals of the third switching element and the seventh switching element.

In a thirteenth aspect of the present invention, in the twelfth aspect, the second control lines may be arranged between the control lines that are connected to the control terminals of the first switching elements and the control terminals of the third switching elements, and the control lines that are connected to the control terminals of the fifth switching elements and the control terminals of the seventh switching elements.

In a fourteenth aspect of the present invention, in the twelfth to thirteenth aspects, may further include a plurality of pixel groups each configured by the first pixel, the second pixel, the third pixel, and the fourth pixel, wherein the output terminals of the second switching elements of the first pixels, the fourth switching elements of the second pixels, the sixth switching elements of the third pixels, and the eighth switching elements of the fourth pixels, that are adjacent in the column direction and form the pixel groups, may be connected to the first signal lines that are different for each pixel groups.

In a fifteenth aspect of the present invention, in the twelfth to fourteenth aspects, wherein the second control lines to which the control terminals of the second switching elements of the first pixels, the fourth switching elements of the second pixels, the sixth switching elements the third pixels, and the eighth switching elements the fourth pixels, that are adjacent in the column direction and forming the pixel groups, may be connected to the same external terminal.

In a sixteenth aspect of the present invention, in the twelfth to fourteenth aspects, each of the second control lines may be connected to different external terminals.

As described above, the above aspects of the present invention provide a radiation detection element and a radiographic imaging device that may realize optimal resolution according to the purpose of use and an imaging speed, and that may suppress an increase in device size.

BRIEF DESCRIPTION OF THE DRAWINGS

Exemplary embodiments of the present invention will be described in detail based on the following figures, wherein.

DETAILED DESCRIPTION OF THE INVENTION

Hereinafter, exemplary embodiments of the present invention will be described with reference to the drawings.

First Exemplary Embodiment

Figure 1:
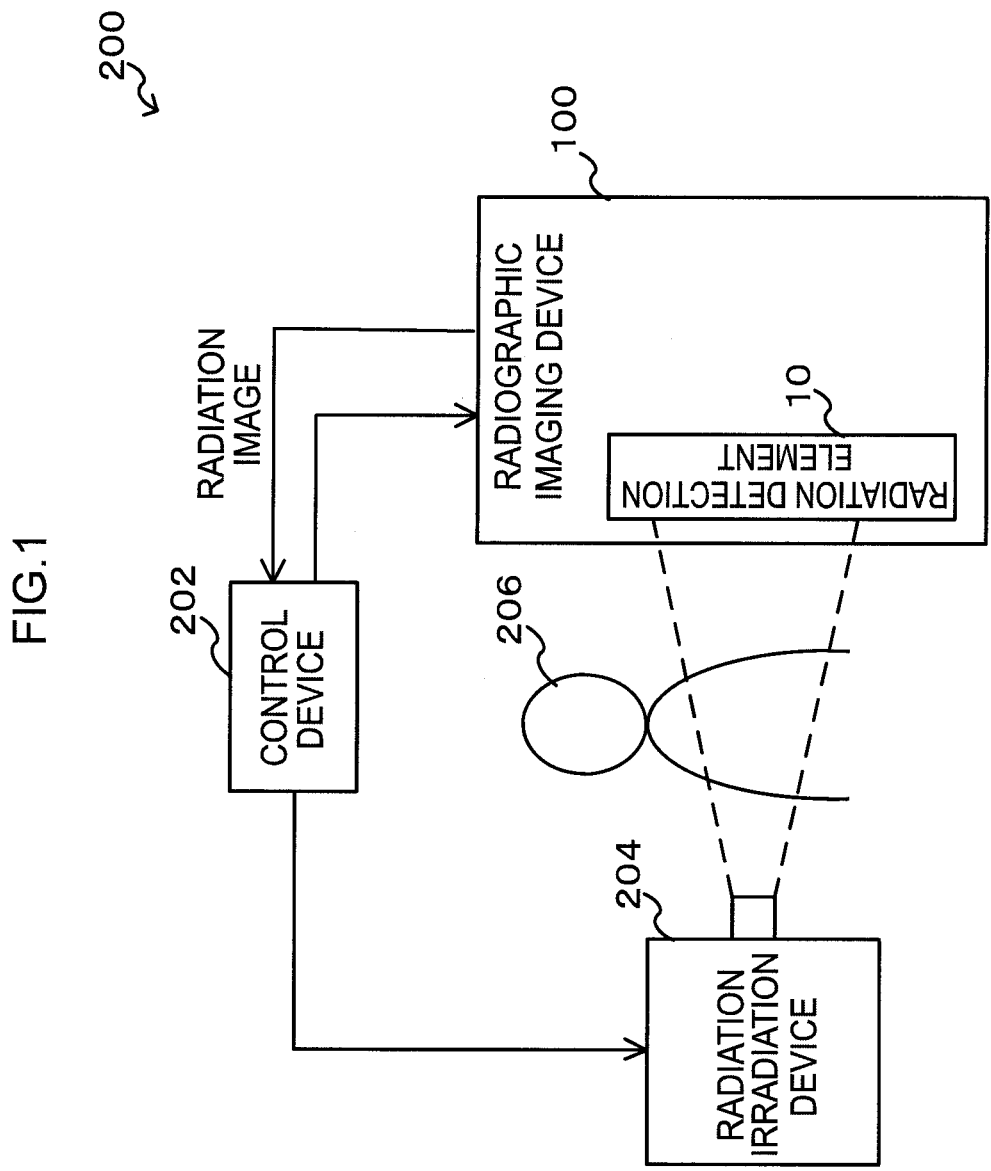
FIG. 1 is a diagram illustrating the schematic configuration of a radiographic imaging system according to a first exemplary embodiment.

Firstly, the schematic configuration of a radiographic imaging system employing a radiographic imaging device according to the first exemplary embodiment will be described. FIG. 1 is a diagram illustrating the schematic configuration of the radiographic imaging system according to the first exemplary embodiment.

A radiographic imaging system 200 includes a radiation irradiation device 204, a radiographic imaging device 100 including a radiation detection element 10, and a control device 202. The radiation irradiation device 204 irradiates radiation (for example, X-rays) onto a subject of photographing 206. The radiation detection element 10 detects the radiation that is irradiated from the radiation irradiation device 204 and is passed through the subject of photographing 206. The control device 202 instructs the radiographic imaging device 100 to image a radiation image, and acquires the radiation image from the radiographic imaging device 100. At timing based on the control from the control device 202, the radiation that is irradiated from the radiation irradiation device 204, is passed through the subject of photographing 206 positioned at an imaging position, and carries image information to be irradiated onto the radiographic imaging device 100.

The radiographic imaging system 200 images a still image and a moving image. The control device 202 switches image imaging into still image imaging or moving image imaging according to an instruction from a user or on the basis of the control from the radiation irradiation device 204, and instructs the radiographic imaging device 100 to switch the imaging.

Figure 2:
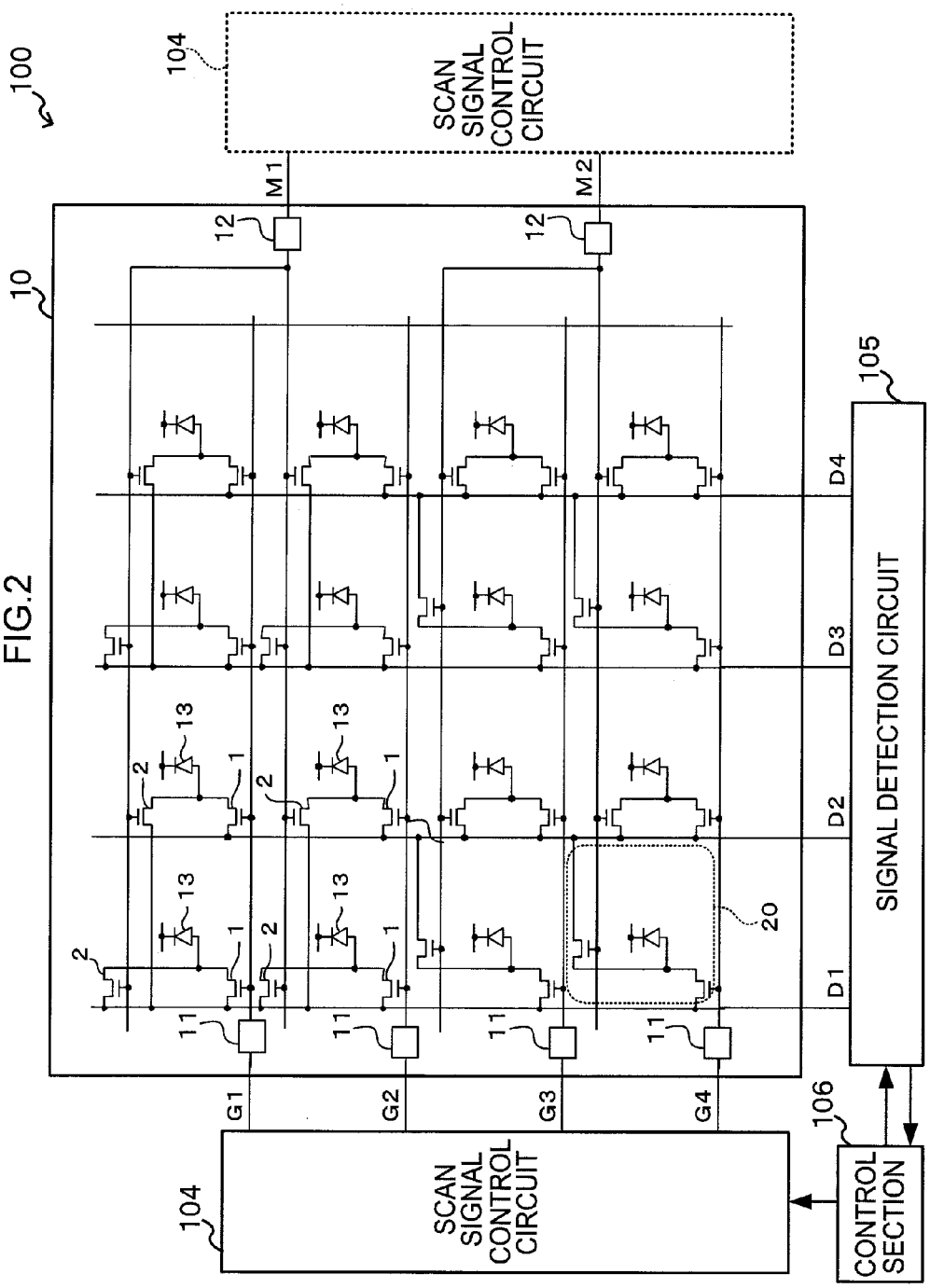
FIG. 2 is a diagram illustrating the entire configuration of a radiographic imaging device according to the first exemplary embodiment.

Next, the schematic configuration of the radiographic imaging device 100 according to the present exemplary embodiment will be described. In the present exemplary embodiment, a case in which the present invention is applied to the radiation detection element 10 of an indirect-conversion-type that converts the radiation such as X-rays into light, and that converts the converted light into charges, will be described. In the present exemplary embodiment, the radiographic imaging device 100 includes the radiation detection element 10 of the indirect conversion system. In FIG. 2, a scintillator that converts radiation into light is not illustrated.

In the radiation detection element 10, plural pixels 20 each including a sensor section 13 and two TFTs (TFT 1 and TFT 2) which is a switching element, are arranged in a matrix. The sensor section 13 receives light, generates charges, and accumulates the generated charges. The switching element reads out the charges that are accumulated in the sensor section 13. In the present exemplary embodiment, the light that is converted by the scintillator and is irradiated to the sensor sections 13 that generate the charges.

The plural pixels 20 are arranged in a matrix in one direction (horizontal direction of FIG. 2; hereinafter, referred to as "row direction") and a direction (vertical direction of FIG. 2; hereinafter, referred to as "column direction") crossing the row direction. FIG. 2 schematically illustrates the arrangement of the pixels 20. However, as an example, 1024×1024 pixels 20 are arranged in the row direction and the column direction.

In the radiation detection element 10, plural control lines G (in FIG. 2, G1 to G4), plural control lines M (in FIG. 2, M1 and M2), and plural signal lines D (in FIG. 2, D1 to D4) are provided to intersect with each other. The plural control lines G (in FIG. 2, G1 to G4) control ON/OFF of the TFT 1. The plural control lines M (in FIG. 2, M1 and M2) control ON/OFF of the TFT 2. The plural signal lines D (in FIG. 2, D1 to D4) are provided for each column of the pixels 20 to read the charges accumulated in the sensor section 13. In the present exemplary embodiment, when the 1024×1024 pixels 20 are arranged in the row direction and the column direction, the number of each of the control lines G and the signal lines D is 1024. In this case, the number of control lines M is 512, to be half the number of control lines G.

The sensor section 13 of each pixel 20 is connected to a common line that is not illustrated in the drawings. To the sensor section 13, a bias voltage is applied from a power supply (not illustrated in the drawings) through the common line.

A control signal that switches each TFT 1 flows in the control line G. Accordingly, the control signal flows to each control line G and each TFT 1 is switched. A control signal that switches each TFT 2 flows in the control line M. Accordingly, the control signal flows to each control line M and each TFT 2 is switched.

An electric signal according to the amount of charges accumulated in each pixel 20 flows through the signal line D through the TFT 1 or the TFT 2, according to a switching state of the TFT 1 and a switching state of the TFT 2 of each pixel 20.

A signal detection circuit 105, that detects the electric signal that has flown out to each signal line D, is connected to each signal line D. A scan signal control circuit 104 is connected to each control line G through an external terminal 11, that outputs a control signal to turn ON/OFF the TFT 1 to each control line G. To the scan signal control circuit 104, each control line M is connected via the external terminal 12 to output the control signal to turn ON/OFF the TFT 2 to each control line M. FIG. 2 illustrates the two scan signal control circuits 104 (at both the left side and the right side of the radiation detection element 10) to simplify illustration of the lines. In the present exemplary embodiment, the scan signal control circuits 104 are not separated from each other, but are integrated with each other. However, the scan signal control circuits 104 may be separated from each other.

FIG. 2 illustrates one signal detection circuit 105 and one scan signal control circuit 104 to simplify the illustration. However, the plural signal detection circuits 105 and the plural scan signal control circuits 104 are provided, and are connect to the signal lines D or the control lines G and the control lines M, for every lines of the predetermined number (for example, 256). For example, when the 1024 signal lines D and the 1024 control lines G are provided, the four scan signal control circuits 104 are provided such that each scan signal control circuit 104 are connected to the 256 control lines G, and the four signal detection circuits 105 are provided such that each scan signal control circuit 105 are connected to the 256 signal lines D.

The signal detection circuit 105 includes therein an amplifying circuit (not illustrated in the drawings) that amplifies the input electric signal, for each signal line D. In the signal detection circuit 105, the electric signal that is input via each signal line D is amplified by the amplifying circuit, and is converted into a digital signal by an analog/digital converter (ADC) (not illustrated in the drawings).

A control section 106 is connected to the signal detection circuit 105 and the scan signal control circuit 104. The control section 106 executes a predetermined process, such as noise removal process with respect to the digital signal converted in the signal detection circuit 105. In addition, the control section 106 outputs a control signal that indicates timing of signal detection to the signal detection circuit 105, and outputs a control signal indicating timing of an output of a scan signal to the scan signal control circuit 104.

The control section 106 according to the present exemplary embodiment is configured by a microcomputer, and includes a central processing section (CPU), ROM and RAM, and a nonvolatile storage section that is configured by a flash memory. The control section 106 executes a predetermined process with respect to image data of the pixels 20 for radiation detection, generates a radiation image represented by the irradiated radiation, and outputs the radiation image.

Next, an imaging operation of imaging a radiation image, executed by the radiographic imaging device 100 (radiation detection element 10) according to the present exemplary embodiment, will be described with reference to FIG. 3. The radiographic imaging device 100 detects the start of radiation irradiation, accumulates the charges in each pixel 20 of the radiation detection element 10, outputs a radiation image based on image data according to the accumulated charges, and images the radiation image.

In the radiographic imaging device 100 according to the present exemplary embodiment, two types of image imaging, namely, imaging with high resolution (for example, still image imaging) and imaging with a high frame rate (for example, moving image imaging) can be performed. However, in the radiographic imaging device 100 according to the present exemplary embodiment, an operation is different according to each type. Hereinafter, each imaging type will be described, and the imaging with the high resolution will be referred to as "still image imaging", and the imaging with the high frame rate will be referred to as "moving image imaging".

In the present exemplary embodiment, the still image imaging or the moving image imaging is performed on the basis of an instruction from the control device 202. The charges according to the irradiated radiation are accumulated by the sensor section 103, regardless of the still image imaging and the moving image imaging.

First, a case in which the still image imaging is performed, will be described.

When the still image imaging is performed, the control signal is output from the scan signal control circuit 104 to the control line M through the external terminal 12, to turn OFF the TFT 2. Meanwhile, the control signal is output from the scan signal control circuit 104 to the control line G through the external terminal 11, to turn ON the TFT 1. In the pixels 20 in a state in which the TFT 1 is turned ON, the charges are read-out from the sensor section 13 and are output to the signal line D.

Accordingly, in the radiographic imaging device 100 according to the present exemplary embodiment, when the still image imaging is performed, the charges flow through all of the signal lines D1 to D4, for each column. Namely, the charges flow through the signal line D, for each pixel 20.

The electric signal according to the charges is converted into the digital signal by the signal detection circuit 105, and the radiation image based on the image data according to the electric signal is generated by the control section 106.

Next, a case in which the moving image imaging is performed, will be described.

When the moving image imaging is performed, the control signal is output from the scan signal control circuit 104 to the control line G through the external terminal 11, to turn OFF the TFT 1. Meanwhile, the control signal is output from the scan signal control circuit 104 to the control line M through the external terminal 12, to turn ON the TFT 2. In the pixels 20, in a state in which the TFT 2 is turned ON, the charges are read-out from the sensor section 13, and are output to the signal line D.

Figure 3:
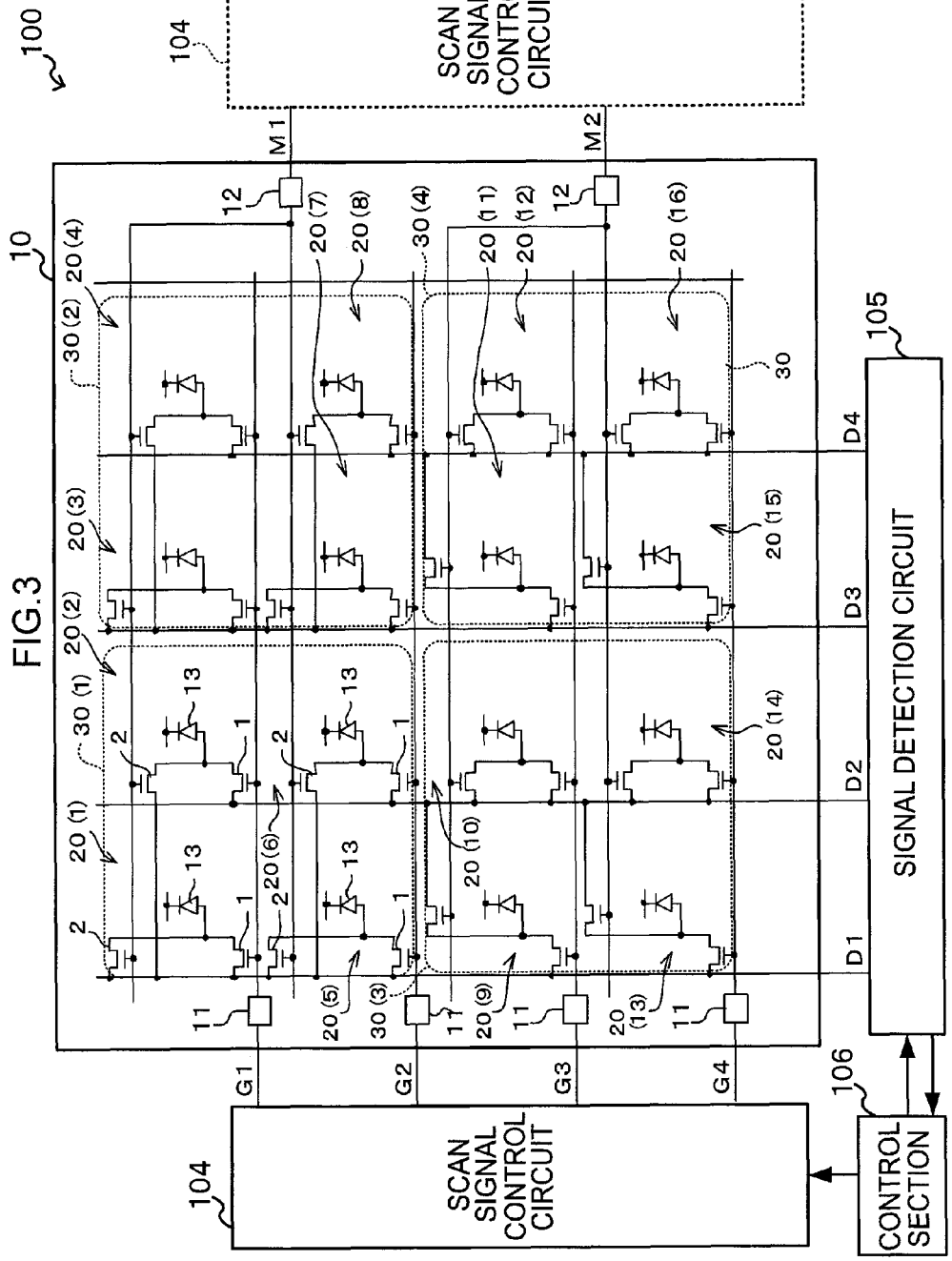
FIG. 3 is a diagram illustrating a still imaging operation and a moving imaging operation in the radiographic imaging device according to the first exemplary embodiment.

As illustrated in FIG. 3, when the control signal is output to the control line M1 to turn ON the TFT 2, the TFTs 2 of the eight pixels 20 (20(1) to 20(8)) are turned ON. Next, the charges of the four pixels 20 (20(1), 20(2), 20(5), and 20(6)) are output to the signal line D1. Further, the charges of the four pixels 20 (20(3), 20(4), 20(7), and 20(8)) are output to the signal line D3.

Further, when the control signal is output to the control line M2 to turn ON the TFT 2, the TFTs 2 of the eight pixels 20 (20(9) to 20(16)) are turned ON. Next, the charges of the four pixels 20 (20(9), 20(10), 20(13), and 20(14)) are output to the signal line D2. Further, the charges of the four pixels 20 (20(11), 20(12), 20(15), and 20(16)) are output to the signal line D4.

Accordingly, in the radiographic imaging device 100 according to the present exemplary embodiment, when the moving image imaging is performed, the sum of the charges of the two pixels×the two pixels alternately flows through the adjacent signal lines D (alternately flows into the even number signal lines D and the odd number signal lines D).

Therefore, in the present exemplary embodiment, when the moving image imaging is performed, the two pixels 20×the two pixels 20 are regarded as one pixel 30, and the charges are extracted. Accordingly, in the present exemplary embodiment, the resolution becomes lower than the resolution of the still image, and the frame rate may be doubled (frame period may be decreased to ½).

As described above, in the radiographic imaging device 100 (radiation detection element 10) according to the present exemplary embodiment, the TFTs 2 of the plural pixels 20 in a column direction are connected to the same signal line D. When the moving image imaging is performed, the radiographic imaging device 100 (radiation detection element 10) according to the present exemplary embodiment, outputs the control signal by the control line M, turns ON the TFT 2 of the pixel 20, and reads the charges from the sensor section 13. Therefore, the radiographic imaging device 100 (radiation detection element 10) according to the present exemplary embodiment regards the two pixels 20×the two pixels 20 as one pixel 30, and extracts the charges. Accordingly, the resolution becomes lower than the resolution of the still image, and the frame rate may be doubled (frame period may be decreased to ½).

Therefore, in the radiographic imaging device 100 (radiation detection element 10) according to the present exemplary embodiment, there is not needed to separately provide the signal line D to flow the charges at the time of imaging the moving image. Accordingly, the radiographic imaging device 100 (radiation detection element 10) according to the present exemplary embodiment may provide the optimal resolution according to an image imaging purpose, such as the still image and the moving image, and the imaging speed, and may suppress increase in the size of the radiation detection element 10.

In the radiographic imaging device 100 (radiation detection element 10) according to the present exemplary embodiment, the number of pixels that are simultaneously read-out during one integration period is quadrupled. Therefore, the intensity of the data signal S can be quadrupled. Accordingly, the radiographic imaging device 100 (radiation detection element 10) according to the present exemplary embodiment may improve the pixel density (S/N).

Second Exemplary Embodiment

A radiographic imaging device according to a second exemplary embodiment includes almost the same configuration as the radiographic imaging device 100 according to the first exemplary embodiment. Accordingly, the description of the same portion as that of the first exemplary embodiment will be omitted. In the radiographic imaging device according to the present exemplary embodiment, the configuration of the radiation detection element differs from that of the radiation detection element 10 according to the first exemplary embodiment. Accordingly, the radiation detection element according to the present exemplary embodiment will be described in detail.

Figure 4:
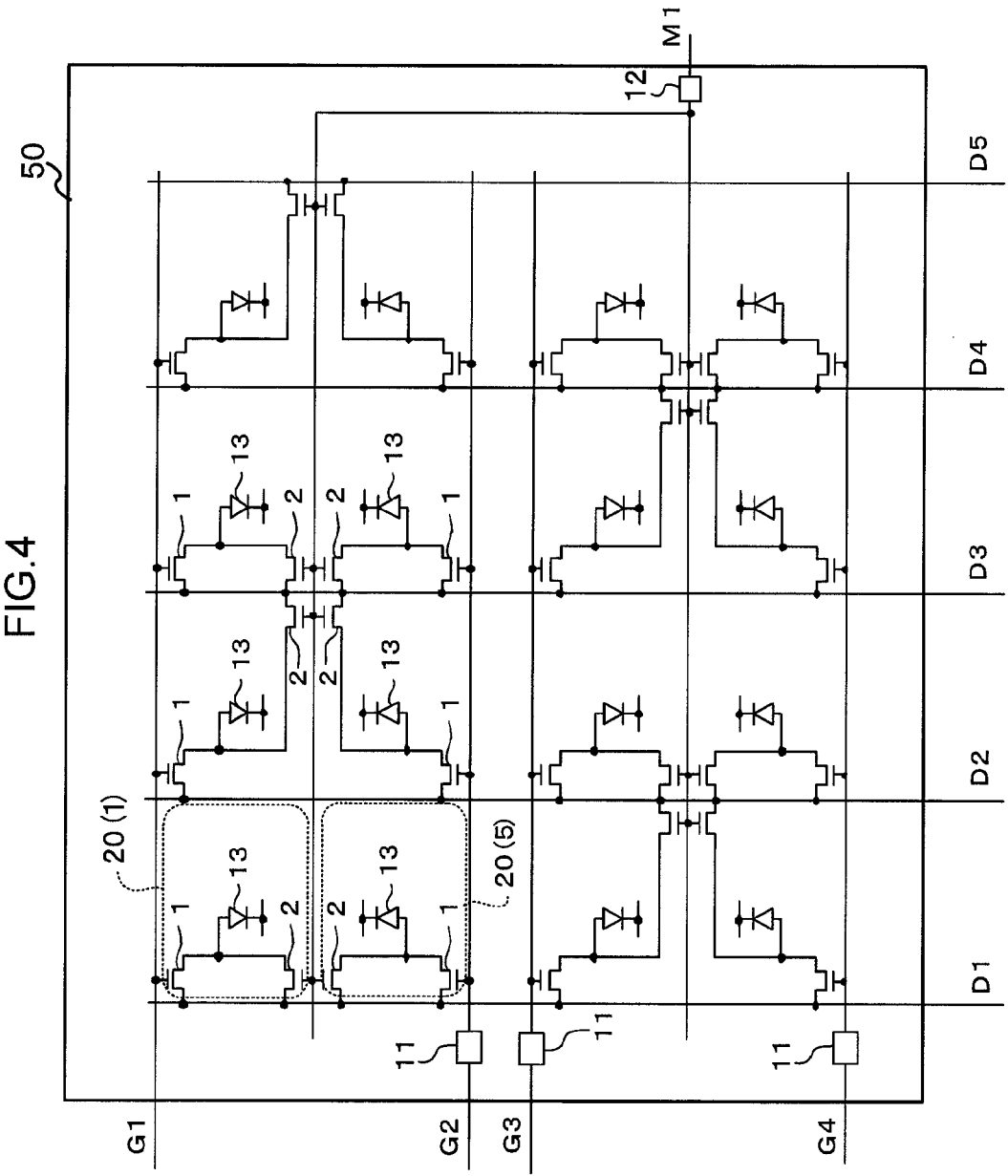
FIG. 4 is a diagram illustrating the schematic configuration of a radiation detection element according to a second exemplary embodiment.

FIG. 4 is a diagram illustrating the schematic configuration of the radiation detection element according to the second exemplary embodiment.

Similar to the radiation detection element 10 according to the first exemplary embodiment, in a radiation detection element 50 according to the present exemplary embodiment, plural pixels 20 each including a sensor section 13 and two TFTs (TFT 1 for a still image and TFT 2 for a moving image) which is a switching element, are arranged in a matrix. The switching element read-out the charges that are accumulated in the sensor section 13.

In the radiation detection element 10, plural control lines G (in FIG. 4, G1 to G4), plural control lines M (in FIG. 4, M1), and plural signal lines D (in FIG. 4, D1 to D5) are provided to intersect with each other. The plural control lines G (in FIG. 4, G1 to G4) control ON/OFF of the TFT 1. The plural control lines M (in FIG. 4, M1) control ON/OFF of the TFT 2. The plural signal lines D (in FIG. 4, D1 to D5) are provided for each column of the pixels 20 to read the charges accumulated in the sensor section 13. In FIG. 4, only one control line M (control line M1) is illustrated. However, the number of control lines correspond to the number of rows of the pixels 20, and Namely, ¼ of the number of control lines G (¼ number of rows of the pixels 20) are provided.

The radiation detection element 50 according to the present exemplary embodiment is configured such that a position relation, with respect to the pixels 20 of the control lines G and the control lines M, to which the control terminals of the TFT 1 and TFT 2 connected to the same sensor section 13, are connected, is inverted in the even number rows and the odd number rows. As illustrated in FIG. 4, an arrangement relation of the TFT 1, the TFT 2, and the sensor section 13 is inverted in the even number lines and the odd number lines of the control lines G. Namely, the TFT 1, the TFT 2, and the sensor section 13 are disposed such that the arrangement positions become linearly symmetric with the control lines M disposed therebetween, as shown in the pixels 20 (1) and 20 (5). By disposing the individual elements, the TFTs 2 of the pixels 20 (1) and 20 (5) can also function as the control lines M. Accordingly, in the present exemplary embodiment, the number of control lines M can be reduced as compared with the first exemplary embodiment. Therefore, in the present exemplary embodiment, the number of control lines (control lines G+control lines M) can be decreased as compared with the first exemplary embodiment.

In the radiation detection element 10 according to the first exemplary embodiment that is illustrated in FIG. 2, the eight control lines that include the four control lines G1 to G4 and the four control lines M1×2 and M2×2 are needed. Therefore, in the radiation detection element 10 according to the first exemplary embodiment, the control lines of the number of rows×2 are needed. Meanwhile, in the radiation detection element 50 according to the present exemplary embodiment that is illustrated in FIG. 4, the six control lines that include the four control lines G1 to G4 and the two control lines M1×2 are needed. Therefore, the control lines of the number of rows×1.5 are needed. As such, in the radiation detection element 50 according to the present exemplary embodiment, the number of control lines can be reduced.

In the radiation detection element 50 according to the present exemplary embodiment, the TFT 1 is disposed to be closer to the control line G than the TFT 2. Accordingly, the radiation detection element 50 according to the present exemplary embodiment can shorten the connection line to connect the TFT 1 to the control line G. Meanwhile, the TFT 2 is disposed to be closer to the control line M than the TFT 1. Accordingly, the radiation detection element 50 according to the present exemplary embodiment can shorten the connection line to connect the TFT 2 to the control line M. Thereby, the radiation detection element 50 according to the present exemplary embodiment can improve a manufacturing yield.

Next, an imaging operation of a radiation imaging executed by the radiation detection element 50 according to the present exemplary embodiment, will be described with reference to FIG. 5.

First, a case in which still image imaging is performed, will be described.

When the still image imaging is performed, the control signal is output from the scan signal control circuit 104 to the control line M through the external terminal 12, to turn OFF the TFT 2. Meanwhile, the control signal is output from the scan signal control circuit 104 to the control line G through the external terminal 11, to turn ON the TFT 1. In the pixels 20 in a state in which the TFT 1 is turned ON, the charges are read-out from the sensor section 13 and are output to the signal line D.

Due thereto, in the radiographic imaging device 50 according to the present exemplary embodiment, when the still image imaging is performed, similar to the first exemplary embodiment, the charges flow through all of the signal lines D1 to D4, for each column. Namely, the charges flow through the signal line D, for each pixel 20.

Next, a case in which the moving image imaging is performed will be described.

When the moving image imaging is performed, the control signal is output from the scan signal control circuit 104 to the control line G through the external terminal 11, to turn OFF the TFT 1. Meanwhile, the control signal is output from the scan signal control circuit 104 to the control line M through the external terminal 12, to turn ON the TFT 2. In the pixels 20 in a state in which the TFT 2 is turned ON, the charges are read-out from the sensor section 13 and are output to the signal line D.

Figure 5:
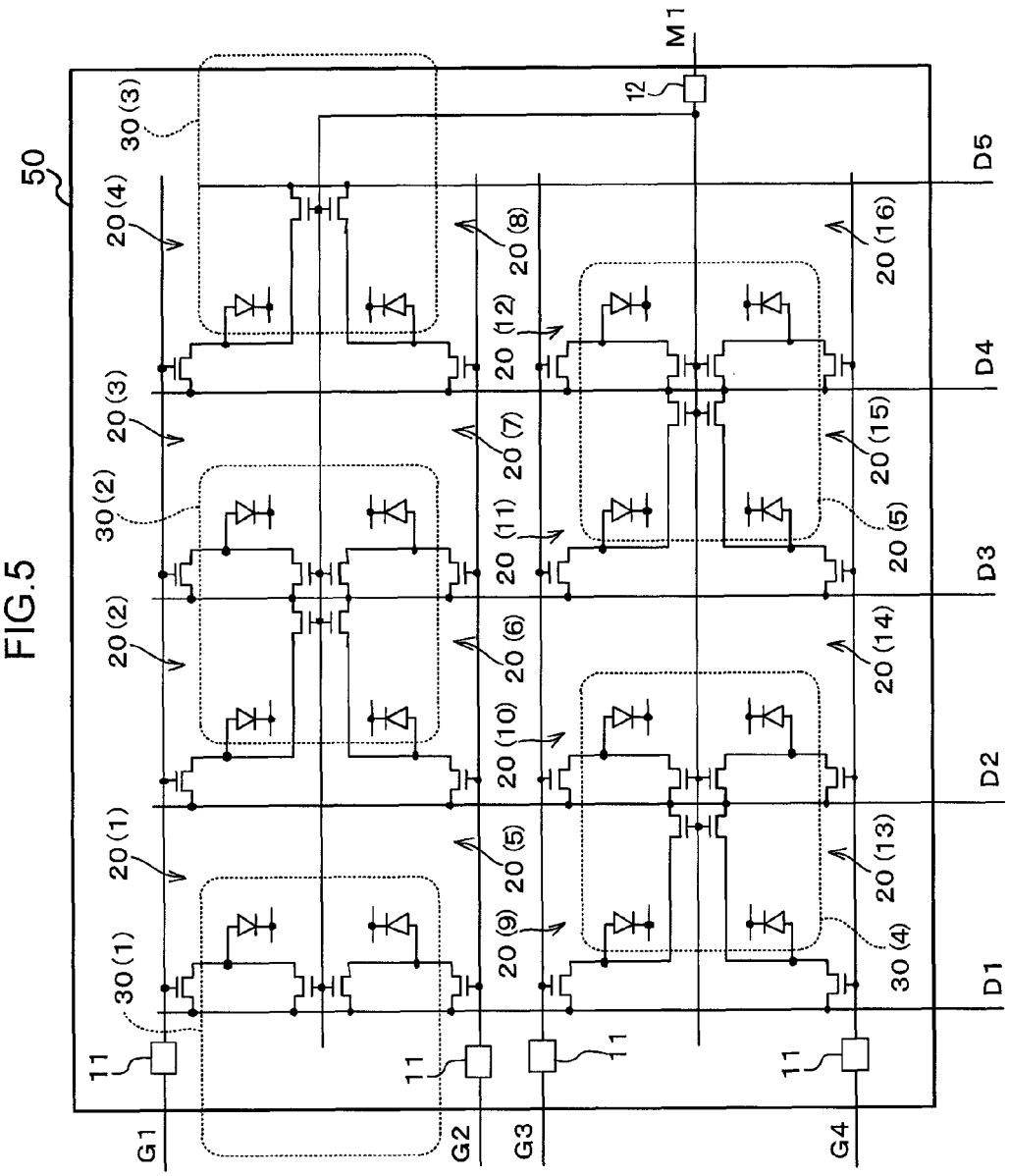
FIG. 5 is a diagram illustrating a still imaging operation and a moving imaging operation in the radiation detection element according to the second exemplary embodiment.

As illustrated in FIG. 5, if the control signal is output to the control line M1 to turn ON the TFT 2, the TFTs 2 of the sixteen pixels 20 (20(1) to 20(16)) are turned on. Next, the charges of the two pixels 20 (20(1) and 20(5)) are output to the signal line D1. Further, the charges of the four pixels 20 (20(9), 20(10), 20(13), and 20(14)) are output to the signal line D2. Further, the charges of the four pixels 20 (20(2), 20(3), 20(6), and 20(7)) are output to the signal line D3, and the charges of the four pixels 20 (20(11), 20(12), 20(15), and 20(16)) are output to the signal line D4. Furthermore, the charges of the two pixels 20 (20(4) and 20(8)) are output to the signal line D5.

Accordingly, in the radiographic imaging device 50 according to the present exemplary embodiment, when the moving image imaging is performed, the sum of the charges of the two pixels×the two pixels flows into the adjacent signal lines D. Therefore, in the present exemplary embodiment, when the moving image imaging is performed, the two pixels 20×the two pixels 20 are regarded as one pixel 30, and the charges are read-out. Accordingly, in the radiation detection element 50 according to the present exemplary embodiment, the resolution becomes lower than the resolution of the still image. However, the frame rate may be quadrupled (frame period can be decreased to ¼).

As described above, in the radiographic imaging device 50 according to the present exemplary embodiment, the elements (the TFT 1, the TFT 2, and the sensor section 13) are arranged such that the two pixels 20×the two pixels 20 are regarded as one pixel 30. Therefore, in the radiation detection element 50 according to the present exemplary embodiment, as compared with imaging of the still image, the frame rate may be improved. In particular, in the present exemplary embodiment, the pixel 30 that is regarded as one pixel is arranged at the different position in the column direction. Therefore, the radiation detection element 50 according to the present exemplary embodiment makes the charge flow through the adjacent signal lines D by one read operation. Accordingly, the radiation detection element 50 according to the present exemplary embodiment may quadruple the frame rate.

The radiation detection element 50 according to the present exemplary embodiment is disposed to be linearly symmetric to the control line M. Accordingly, the radiation detection element 50 according to the present exemplary embodiment may suppress the number of control lines from increasing. As a result, the length of a connection electrode (not illustrated in the drawings) of the outputs of the TFT 1 and TFT 2 and the signal line D may be decreased. Thereby, the radiation detection element 50 according to the present exemplary embodiment may maintain a high manufacturing yield.

Third Exemplary Embodiment

In a radiographic imaging device according to the third exemplary embodiment, the configuration of the radiation detection element is partially different from the configuration of the radiation detection element 50 according to the second exemplary embodiment. Accordingly, the radiation detection element according to the present exemplary embodiment will be described in detail. The description of the configuration and the operation that are the same as those of the second exemplary embodiment will be omitted.

Figure 6:
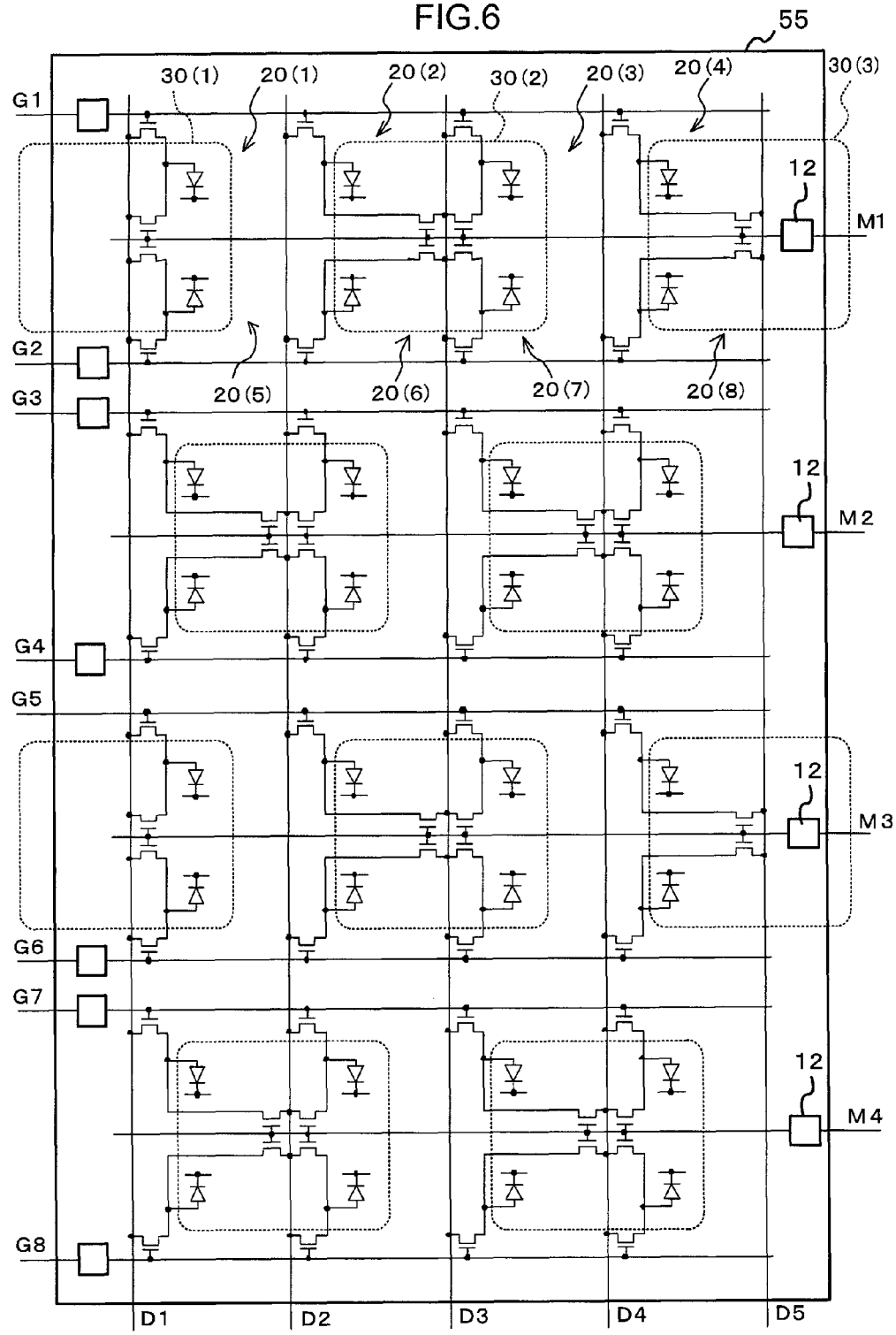
FIG. 6 is a diagram illustrating the schematic configuration of a radiation detection element according to a third exemplary embodiment.

FIG. 6 illustrates the schematic configuration of the radiation detection element according to the third exemplary embodiment. In the present exemplary embodiment, the control line M1 to which the pixels 20 of the four rows are connected, is provided. The control line M1 is connected to the scan signal control circuit 104 through one external connection terminal 12. Meanwhile, in the present exemplary embodiment, as illustrated in FIG. 6, the radiation detection element 55 includes the control lines M (M1 and M2) to which the pixels 20 of the two rows are connected. Namely, in the present exemplary embodiment, the control line M is provided for each row of the pixel 30 configured by the four pixels 20.

Specifically, the radiation detection element 55 according to the present exemplary embodiment includes the control lines M1 and M2 as a set of control lines M (corresponding to the control line M1 according to the second exemplary embodiment), that outputs the control signal to the TFT 2 at the same timing (or almost the same timing). The control line M1 is connected to the TFT 2 of the pixel 20 that includes the TFT 1 connected to the control lines G1 and G2. The control line M2 is connected to the TFT 2 of the pixel 20 that includes the TFT 1 connected to the control lines G3 and G4. Likewise, the radiation detection element 55 includes the control lines M3 and M4 as a set of control lines M that outputs the control signal to the TFT 2 at the same timing (or almost the same timing). The control line M3 is connected to the TFT 2 of the pixel 20 that includes the TFT 1 connected to the control lines G5 and G6. The control line M4 is connected to the TFT 2 of the pixel 20 that includes the TFT 1 connected to the control lines G7 and G8. The radiation detection element 55 is connected to the scan signal control circuit 104 through the external terminal 12, for each set of the control lines M.

Accordingly, in the present exemplary embodiment, the frame rate may be quadrupled by simultaneously driving the switching elements, for each set of the control lines M (outputting the control signal from the scan signal control circuit 104).

In the present exemplary embodiment, the number of TFTs 2 connected to one control line M is smaller than the number of TFTs 2 connected to the control line M in the second exemplary embodiment. Namely, in the case of the present exemplary embodiment illustrated in FIG. 6, the TFTs 2 of the eight pixels 20 are connected to the control line M1. Meanwhile, in the case of the second exemplary embodiment illustrated in FIG. 5, the TFTs 2 of the sixteen pixels 20 are connected to the control line M1.

Accordingly, in the present exemplary embodiment, since the number of TFTs 2 connected to each control line M is smaller than the number in the second exemplary embodiment, the line capacitance for each control line M may be decreased. Therefore, in the present exemplary embodiment, the control signal may be suppressed from being delayed due to an increase in the number of TFTs 2 to be connected. In the present exemplary embodiment, a load that is applied to the scan signal control circuit 104 may also be decreased.

In the present exemplary embodiment, whether the control line M is provided for each row of the pixels 30 may be determined by a driving capability of the scan signal control circuit 104.

Fourth Exemplary Embodiment

The radiation detection element of the radiographic imaging device according to the fourth exemplary embodiment has almost the same configuration as those of the radiation detection element 10 according to the first exemplary embodiment, the radiation detection element 50 according to the second exemplary embodiment, and the radiation detection element 55 according to the third exemplary embodiment. Accordingly, the description of the same portion as those of the first to third exemplary embodiments will be omitted FIG. 7 is a diagram illustrating the schematic configuration of the radiation detection element according to the fourth exemplary embodiment.

In the radiation detection element 60 according to the present exemplary embodiment, similar to the radiation detection element 10 according to the first exemplary embodiment and the radiation detection element 50 according to the second exemplary embodiment, plural pixels 20 each including a sensor section 13 and two TFTs (TFT 1 for a still image and TFT 2 for a moving image), which is a switching element, are arranged in a matrix.

In the radiation detection element 60, plural control lines G (in FIG. 6, G1 to G4) and plural control lines M (in FIG. 6, M1 and M2) and plural signal lines D (in FIG. 6, D1 to D5) are provided to intersect with each other. The plural control lines G (in FIG. 6, G1 to G4) control ON/OFF of the TFT 1. The plural control lines M (in FIG. 6, M1 and M2) control ON/OFF of the TFT 2. The plural signal lines D (in FIG. 6, D1 to D5) are provided for each column of the pixels 20 to read-out the charges accumulated in the sensor section 13.

Figure 7:
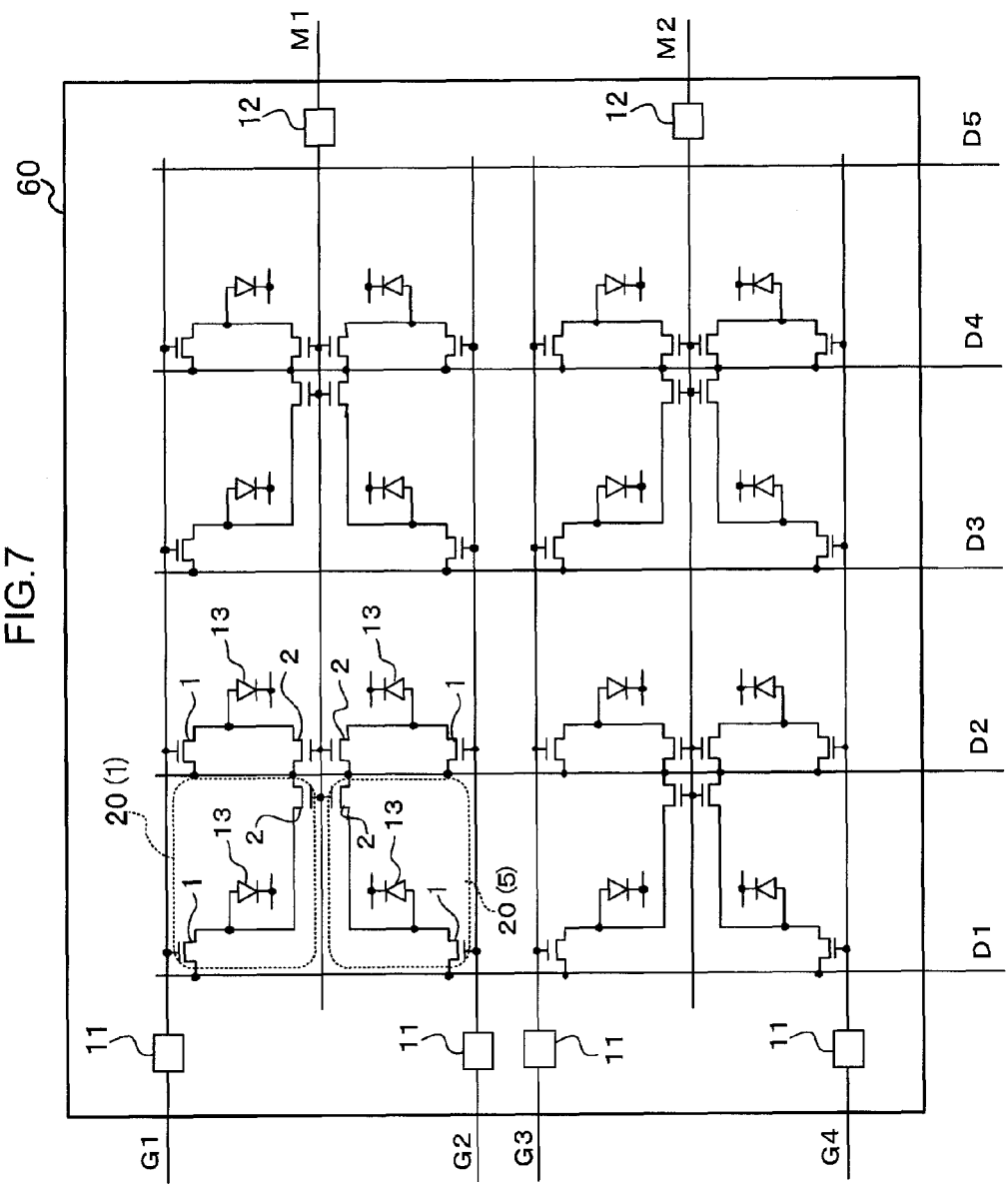
FIG. 7 is a diagram illustrating the schematic configuration of a radiation detection element according to a fourth exemplary embodiment.

As illustrated in FIG. 7, similar to the radiation detection element 50 according to the second exemplary embodiment, the radiation detection element 60 according to the present exemplary embodiment is configured such that an arrangement relation of the TFT 1, the TFT 2, and the sensor section 13 is inverted in the even number lines and the odd number lines of the control lines G. Therefore, the number of control lines may be decreased when compared to the first exemplary embodiment.

Next, an imaging operation of a radiation imaging executed by the radiation detection element 60 according to the present exemplary embodiment will be described with reference to FIG. 8.

First, a case in which the still image imaging is performed, will be described.

When the still image imaging is performed, the control signal is output from the scan signal control circuit 104 to the control line M through the external terminal 12, to turn OFF the TFT 2. Meanwhile, the control signal is output from the scan signal control circuit 104 to the control line G through the external terminal 11, to turn ON the TFT 1. In the pixels 20 in a state in which the TFT 1 is turned ON, the charges are read from the sensor section 13 and are output to the signal line D.

Accordingly, in the radiographic imaging device 60 according to the present exemplary embodiment, when the still image imaging is performed, similar to the first and second exemplary embodiments, the charges flow through all of the signal lines D1 to D4, for each column. Namely, the charges flow through the signal line D, for each pixel 20.

Next, a case in which the moving image imaging is performed, will be described.

When the moving image imaging is performed, the control signal is output from the scan signal control circuit 104 to the control line G through the external terminal 11, to turn OFF the TFT 1. Meanwhile, the control signal is output from the scan signal control circuit 104 to the control line M through the external terminal 12, to turn ON the TFT 2. In the pixels 20 in a state in which the TFT 2 is turned ON, the charges are read from the sensor section 13 and are output to the signal line D.

Figure 8:
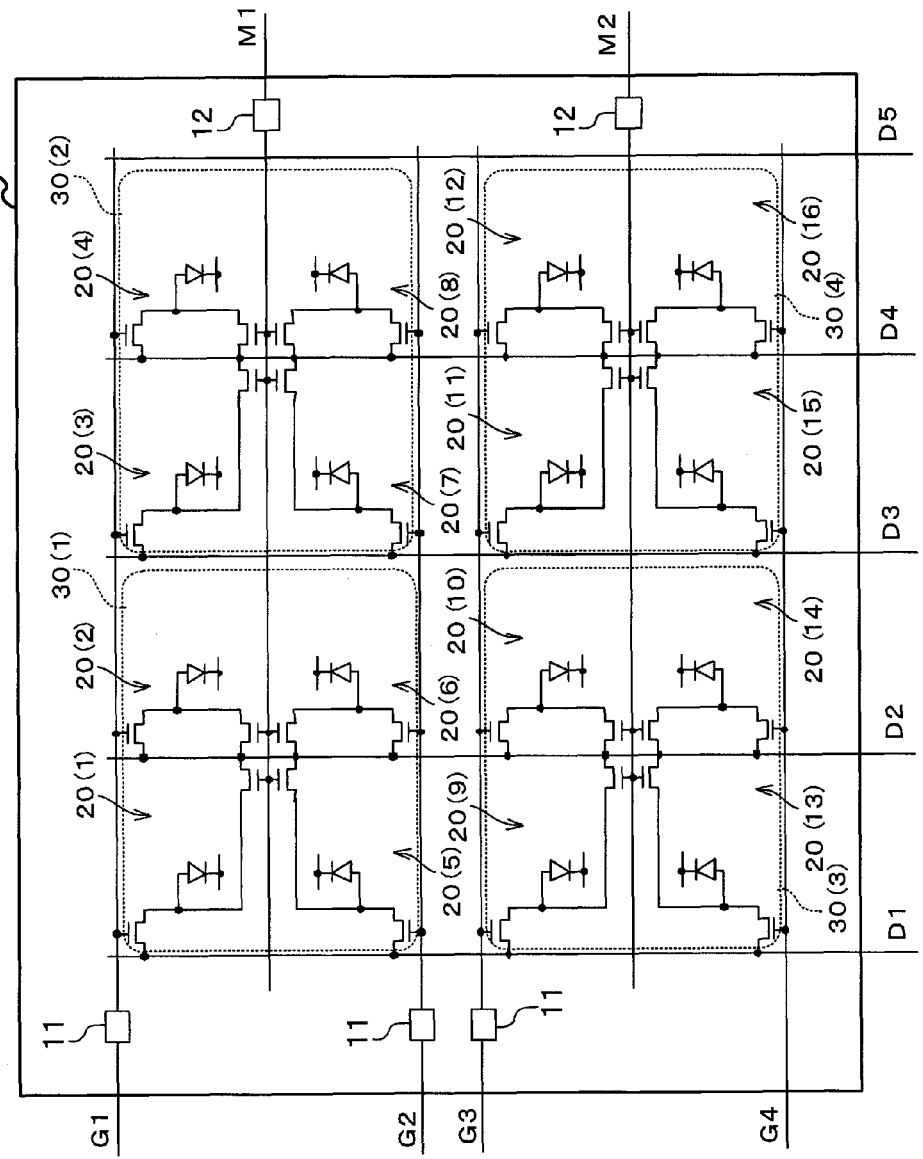
FIG. 8 is a diagram illustrating a still imaging operation and a moving imaging operation in the radiation detection element according to the fourth exemplary embodiment.

As illustrated in FIG. 8, when the control signal is output to the control line M1 to turn ON the TFT 2, the TFTs 2 of the eight pixels 20 (20(1) to 20(8)) are turned on. Next, the charges of the four pixels 20 (20(1), 20(2), 20(5), and 20(6)) are output to the signal line D2. Further, the charges of the four pixels 20 (20(3), 20(4), 20(7), and 20(8)) are output to the signal line D4.

Next, when the control signal is output to the control line M2 to turn ON the TFT 2, the TFT 2 of the four pixels 20 (20(9), 20(10), 20(13), and 20(14)) is turned ON. Next, the charges of the four pixels 20 (20(9), 20(10), 20(13), and 20(14)) are output to the signal line D2. Further, the charges of the four pixels 20 (20(11), 20(12), 20(15), and 20(16)) are output to the signal line D4.

As such, in the radiographic imaging device 60 according to the present exemplary embodiment, when the moving image imaging is performed, the sum of the charges of the two pixels×the two pixels alternately flows through every other signal lines D. As such, in the present exemplary embodiment, when the moving image imaging is performed, the two pixels 20×the two pixels 20 are regarded as one pixel 30 and the charges are read-out. Accordingly, the resolution may become lower than the resolution of the still image, however, the frame rate may be doubled (frame period can be decreased to ½).

As described above, in the radiographic imaging device 60 according to the present exemplary embodiment, when the moving image imaging is performed, the two pixels 20×the two pixels 20 are regarded as one pixel 30, and the charges flow through the signal line D. Accordingly, the radiation detection element 60 according to the present exemplary embodiment may improve the frame rate of the moving image imaging, as compared with the still image imaging.

In the radiation detection element 60 according to the present exemplary embodiment, the charges flow through every other signal line D, from the TFT 2. Accordingly, the radiation detection element 60 according to the present exemplary embodiment may double the frame rate, as compared with the still image imaging. In the radiation detection element 60 according to the present exemplary embodiment, the frame rate is lowered as compared with the radiation detection element 50 according to the second exemplary embodiment. However, the charges corresponding to the four pixels are read-out during one integration period. Accordingly, the radiation detection element 60 according to the present exemplary embodiment may improve the pixel density, as compared with the still image imaging.

As described above, in the first to fourth exemplary embodiments, the TFTs 2 of the plural pixels 20 in the column direction are connected to the same signal line D. Further, when the moving image imaging is performed, the control signal is output through the control line M, the TFT 2 of the pixel 20 is turned ON, and the charges are read-out from the sensor section 13. Since the two pixels 20×the two pixels 20 are regarded as one pixel and the charges are read-out, the resolution is lowered as compared with imaging the still image. However, the frame rate may be improved.

Therefore, in the first to fourth exemplary embodiments, since there is not needed to separately provide the signal line D to flow the charges at the time of imaging the moving image, optimal resolution according to object imaging, such as the still image and the moving image, and the frame rate (imaging speed) may be provided, while the size of the radiation detection element 10 may be suppressed from increasing.

In the first to fourth exemplary embodiments, a case in which the two pixels×the two pixels are regarded as one pixel and the charges are read-out at the time of imaging the moving image, has been described. However, the present invention is not limited thereto, as long as the plural pixels×the plural pixels are regarded as one pixel and the charges are read-out at the time of imaging the moving image. Namely, as an example, the schematic configuration of the radiation detection element 70 in which four pixels×four pixels=16 pixels are regarded as one pixel, and the charges are read-out at the time of imaging the moving image, is illustrated in FIG. 9.

Figure 9:
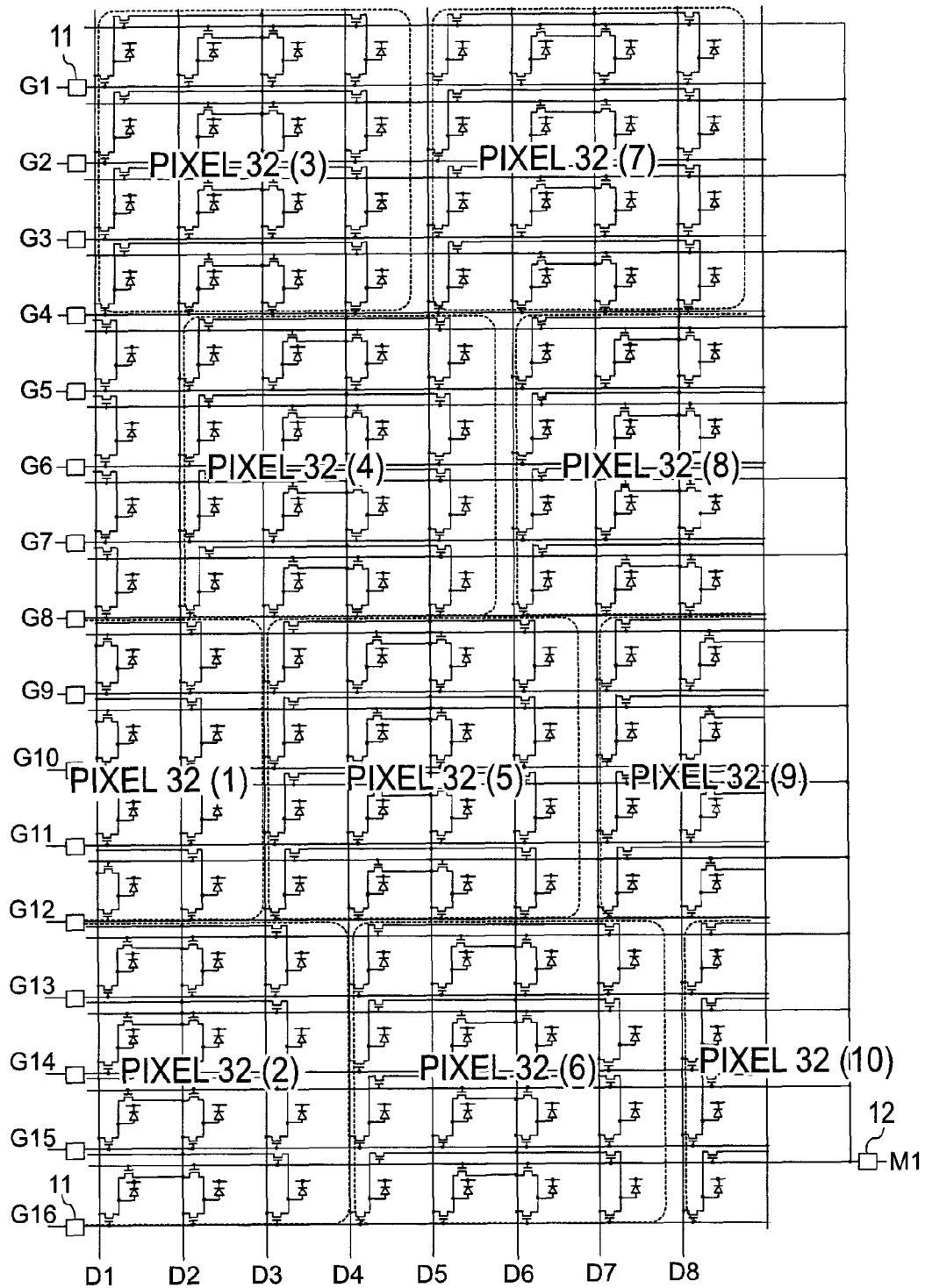
FIG. 9 is a diagram illustrating the schematic configuration of an alternative radiation detection element.

FIG. 9 illustrates the schematic configuration of the radiation detection element 70 in which four pixels×four pixels=16 pixels are regarded as one pixel 32, and the charges are read-out at the time of imaging the moving image. In the radiation detection element 70, when the moving image is imaged, the control signal to turn OFF the TFT 1 is output from the scan signal control circuit 104 to the control lines G (G1 to G16) through the external terminal 11. Further, the control signal to turn ON the TFT 2 is output from the scan signal control circuit 104 to the control line M1 through the external terminal 12. Thereby, the charges corresponding to the four pixels×four pixels (pixel 32) flow through the signal line D.

Specifically, the charges corresponding to four pixels×four pixels=16 pixels that are regarded as the pixel 32 (1) flow through the signal line D1. Likewise, the charges of the pixel 32 (2) flow through the control line D2, the charges of the pixel 32 (3) flow through the control line D3, and the charges of the pixel 32 (4) flow through the control line D4. Accordingly, in the radiation detection element 70 illustrated in FIG. 9, if the control signal to image the still image is output to the control line M1, the charges of the four pixels×the four pixels flow through each of the signal lines D1 to D16 (in FIG. 8, signal lines D9 to D16 are not illustrated). Therefore, the frame rate may be increased 16 times, as compared with the still image imaging. Even in the case of the radiation detection element 70 illustrated in FIG. 9, similar to the third exemplary embodiment, the control line M may be connected to the scan signal control circuit 104 through the external terminal 12, for each row of the pixels 32.

In the first to fourth exemplary embodiments, a case in which the still image is imaged using the TFT 1 and the moving image is imaged using the TFT 2, has been described. However, the present invention is not limited to the still image imaging and the moving image imaging. For example, the moving image imaging to acquire image data in a section of pixel may be performed by using the TFT 1 and the still image imaging to acquire image data in a section of plural pixels may be performed by using the TFT 2.

The configurations and the operations of the radiographic imaging device 100 and the radiation detection elements 10, 50, 60, and 70 that are described in the exemplary embodiments are exemplary, and various changes may be made according to a situation in a range that does not depart from the gist of the present invention.

In the exemplary embodiments, the radiation is not limited in particular, and the radiation, X-rays or gamma rays may be applied.

What is claimed is:

1. A radiation detection element, comprising:
   a plurality of pixels that are arrayed in a grid, each pixel including,
      a sensor section that generates charges according to irradiated radiation,
      a first switching element that read-out the charges from the sensor section and outputs the charges, and
      a second switching element that read-out the charges from the sensor section and outputs the charges;
   a plurality of first control lines connected to control terminals of the first switching elements of the pixels that are adjacent in a row direction;
   a plurality of second control lines connected to control terminals of the second switching elements of the pixels that are adjacent in the row direction; and
   a plurality of signal lines each provided for each column of the pixels, and each connected to output terminals of the first switching elements that are adjacent in the column direction, wherein the plurality of signal lines include signal line groups in which some of the signal lines are connected to output terminals of the second switching elements of the pixels that are adjacent in the column direction and that are adjacent in the row direction.

2. The radiation detection element according to claim 1, wherein the second control lines are connected to the control terminals of the second switching elements of the pixels that are adjacent in the column direction.

3. The radiation detection element according to claim 1, wherein the second control lines are arranged between the first control lines of even number rows and the first control lines of odd number rows.

4. The radiation detection element according to claim 1, further comprising:
   pixel groups, each including the plurality of pixels in which the output terminals of the second switching elements are connected to signal line group, and the control terminals of the second switching elements are connected to the same second control line,
   wherein the output terminals of the second switching elements of plural pixels, that are adjacent in the column direction and form the pixel groups, are connected to different signal line groups for each of the pixel groups.

5. The radiation detection element according to claim 4, wherein the second control lines in which the control terminals of the second switching elements of the plurality of the pixels forming the pixel group and that are adjacent in the column direction, are connected, are connected to the same external terminal.

6. The radiation detection element according to claim 1, wherein each of the second control lines is connected to different external terminals.

7. The radiation detection element according to claim 1, wherein the first switching elements are used for acquiring image information from each of the pixel per unit, and the second switching elements are used for acquiring image information from plural pixels per unit.

8. A radiographic imaging device, comprising:
the radiation detection element according to claim 7; and
a control section that instructs to image a radiation image and acquires the radiation image from the radiographic imaging device,
wherein the control section includes a switching section that switches a first image acquisition method that acquires pixel information from each of the pixel per unit, and a second image acquisition method that acquires pixel information from plural pixels per unit, based on an instruction from the outside.

9. The radiographic imaging device according to claim 8, further comprising: a radiation irradiation section,
wherein the switching section switches the first image acquisition method and the second image acquisition method, based on control from the radiation irradiation section.

10. A radiation detection element, comprising:
a first pixel that includes a first sensor section, a first switching element having an input terminal connected to the first sensor section, and a second switching element having an input terminal connected to the first sensor section;
a second pixel that includes a second sensor section, a third switching element having an input terminal connected to the second sensor section, and a fourth switching element having an input terminal connected to the second sensor section;
a first control line connected to a control terminal of the first switching element and to a control terminal of the third switching element;
a second control line connected to a control terminal of the second switching element and to a control terminal of the fourth switching element;
a first signal line connected to output terminals of the first switching element, the second switching element, and the fourth switching element; and
a second signal line connected to an output terminal of the third switching element.

11. A radiation detection element, comprising:
a first pixel that includes a first sensor section, a first switching element having an input terminal connected to the first sensor section, and a second switching element having an input terminal connected to the first sensor section;
a second pixel that includes a second sensor section, a third switching element having an input terminal connected to the second sensor section, and a fourth switching element having an input terminal connected to the second sensor section;
a third pixel that includes a third sensor section, a fifth switching element having an input terminal connected to the third sensor section, and a sixth switching element having an input terminal connected to the third sensor section;
a fourth pixel that includes a fourth sensor section, a seventh switching element having an input terminal connected to the fourth sensor section, and an eighth switching element having an input terminal connected to the fourth sensor section;
a first control line that includes a control line connected to a control terminal of the first switching element and a control terminal of the third switching element, and a control line connected to a control terminal of the fifth switching element and a control terminal of the seventh switching element;
a second control line that includes a control line connected to a control terminal of the second switching element and a control terminal of the fourth switching element, and a control line connected to a control terminal of the sixth switching element and a control terminal of the eighth switching element;
a first signal line connected to output terminals of the first switching element, the second switching element, the fourth switching element, the fifth switching element, the sixth switching element, and the eighth switching element; and
a second signal line connected to output terminals of the third switching element and the seventh switching element.

12. A radiation detection element, comprising:
a first pixel that includes a first sensor section, a first switching element having an input terminal connected to the first sensor section, and a second switching element having an input terminal connected to the first sensor section;
a second pixel that includes a second sensor section, a third switching element having an input terminal connected to the second sensor section, and a fourth switching element having an input terminal connected to the second sensor section;
a third pixel that includes a third sensor section, a fifth switching element having an input terminal connected to the third sensor section, and a sixth switching element having an input terminal connected to the third sensor section;
a fourth pixel that includes a fourth sensor section, a seventh switching element having an input terminal connected to the fourth sensor section, and an eighth switching element having an input terminal connected to the fourth sensor section;
a first control line that includes a control line connected to a control terminal of the first switching element and a control terminal of the third switching element, and a control line connected to a control terminal of the fifth switching element and a control terminal of the seventh switching element;
a second control line that includes a control line connected to a control terminal of the second switching element, a control terminal of the fourth switching element, a control terminal of the sixth switching element, and a control terminal of the eighth switching element;
a first signal line connected to output terminals of the first switching element, the second switching element, the fourth switching element, the fifth switching element, the sixth switching element, and the eighth switching element; and
a second signal line connected to output terminals of the third switching element and the seventh switching element.

13. The radiation detection element according to claim 12, wherein the second control lines are arranged between the control lines that are connected to the control terminals of the first switching elements and the control terminals of the third switching elements, and the control lines that are connected to the control terminals of the fifth switching elements and the control terminals of the seventh switching elements.

14. The radiation detection element according to claim 12, comprising:

a plurality of pixel groups each configured by the first pixel, the second pixel, the third pixel, and the fourth pixel, wherein the output terminals of the second switching elements of the first pixels, the fourth switching elements of the second pixels, the sixth switching elements of the third pixels, and the eighth switching elements of the fourth pixels, that are adjacent in the column direction and form the pixel groups, are connected to the first signal lines that are different for each pixel groups.

15. The radiation detection element according to claim 12, wherein the second control lines to which the control terminals of the second switching elements of the first pixels, the fourth switching elements of the second pixels, the sixth switching elements the third pixels, and the eighth switching elements the fourth pixels, that are adjacent in the column direction and forming the pixel groups, are connected to the same external terminal.

16. The radiation detection element according to claim 12, wherein each of the second control lines is connected to different external terminals.

* * * * *